United States Patent
Hernandez et al.

(10) Patent No.: US 10,137,671 B2
(45) Date of Patent: Nov. 27, 2018

(54) FLEXIBLE FILM COMPOSITION FOR HEAT SEALS AND CONTAINER WITH SAME

(71) Applicant: Dow Global Technologies LLC, Midland, MI (US)

(72) Inventors: Claudia Hernandez, Lake Jackson, TX (US); Nicolas C. Mazzola, Jundiai (BR); Jozef J. Van Dun, Horgen (CH); Kurt Brunner, Zurich (CH); Maria Isabel Arroyo Villan, Tarragona (ES)

(73) Assignee: Dow Global Technologies LLC, Midland, MI (US)

( * ) Notice: Subject to any disclaimer, the term of this patent is extended or adjusted under 35 U.S.C. 154(b) by 210 days.

(21) Appl. No.: 14/647,164

(22) PCT Filed: Dec. 19, 2013

(86) PCT No.: PCT/US2013/076488
§ 371 (c)(1),
(2) Date: May 26, 2015

(87) PCT Pub. No.: WO2014/100386
PCT Pub. Date: Jun. 26, 2014

(65) Prior Publication Data
US 2015/0328865 A1 Nov. 19, 2015

Related U.S. Application Data

(63) Continuation-in-part of application No. PCT/US2013/072026, filed on Nov. 26, 2013.
(Continued)

(51) Int. Cl.
*B32B 7/02* (2006.01)
*B32B 27/08* (2006.01)
(Continued)

(52) U.S. Cl.
CPC ............ *B32B 27/08* (2013.01); *B32B 27/28* (2013.01); *B32B 27/304* (2013.01);
(Continued)

(58) Field of Classification Search
CPC ........... B32B 7/02; B32B 27/32; B32B 27/06; B32B 27/36
(Continued)

(56) References Cited

U.S. PATENT DOCUMENTS

| 5,504,172 A | 4/1996 | Imuta et al. |
| 6,342,123 B1 | 1/2002 | Rees et al. |

(Continued)

FOREIGN PATENT DOCUMENTS

| CN | 1410261 A | 4/2003 |
| EP | 2204409 A1 | 7/2010 |

(Continued)

OTHER PUBLICATIONS

El-Wax Technical Data Sheet, SCG chemicals.*
Williams et al., Polym. Sci., Polymer Letters, vol. 6, pp. 621-624 (1968).

*Primary Examiner* — Ellen S Wood
(74) *Attorney, Agent, or Firm* — Husch Blackwell LLP

(57) ABSTRACT

The present disclosure is directed to compositions and film structures suitable for heat seal production. The heat sealable flexible film structure includes: a layer (A) comprising a propylene-based plastomer or elastomer ("PBPE") and a low density polyethylene; a layer (B), adjacent to layer (A), comprising at least 50 percent by weight of the layer (B) of an ethylene-based polymer; and an outermost layer (C) comprising a material having a melting point greater than 140° C. Weight percents are based on the total weight of the respective layer. The heat sealable flexible film structure is used to make a flexible container (10) having one or more (Continued)

heat seals (12). The heat seal (12) can be a frangible heat seal, a hard heat seal, or a combination thereof.

19 Claims, 5 Drawing Sheets

Related U.S. Application Data

(60) Provisional application No. 61/739,286, filed on Dec. 19, 2012.

(51) Int. Cl.
| | |
|---|---|
| C08J 5/18 | (2006.01) |
| B32B 27/32 | (2006.01) |
| B65D 65/38 | (2006.01) |
| B65D 75/28 | (2006.01) |
| B65D 75/58 | (2006.01) |
| B32B 27/28 | (2006.01) |
| B32B 27/30 | (2006.01) |
| B32B 27/34 | (2006.01) |
| B32B 27/36 | (2006.01) |

(52) U.S. Cl.
CPC ............ *B32B 27/306* (2013.01); *B32B 27/32* (2013.01); *B32B 27/325* (2013.01); *B32B 27/327* (2013.01); *B32B 27/34* (2013.01); *B32B 27/36* (2013.01); *B65D 65/38* (2013.01); *B65D 75/28* (2013.01); *B65D 75/5855* (2013.01); *C08J 5/18* (2013.01); *B32B 2255/10* (2013.01); *B32B 2255/26* (2013.01); *B32B 2270/00* (2013.01); *B32B 2307/31* (2013.01); *B32B 2307/51* (2013.01); *B32B 2307/72* (2013.01); *B32B 2439/00* (2013.01); *B32B 2439/40* (2013.01); *B32B 2439/46* (2013.01); *C08J 2323/06* (2013.01); *C08J 2323/16* (2013.01); *Y10T 428/1352* (2015.01); *Y10T 428/24992* (2015.01); *Y10T 428/249993* (2015.04); *Y10T 428/264* (2015.01); *Y10T 428/2826* (2015.01)

(58) Field of Classification Search
USPC .............. 428/35.7, 212, 213; 264/171.1, 510
See application file for complete search history.

(56) References Cited

U.S. PATENT DOCUMENTS

| | | |
|---|---|---|
| 6,484,514 B1 | 11/2002 | Joseph et al. |
| 6,525,157 B2 | 2/2003 | Cozewith et al. |
| 6,547,468 B2 | 4/2003 | Gruenbacher et al. |
| 6,590,034 B2 | 7/2003 | Wanic et al. |
| 6,960,635 B2 | 11/2005 | Stevens et al. |
| 7,055,683 B2 | 6/2006 | Bourque et al. |
| 7,306,095 B1 | 12/2007 | Bourque et al. |
| 7,863,383 B2 | 1/2011 | Gibbons et al. |
| 7,976,917 B2 | 7/2011 | Suzuki et al. |
| 2007/0114144 A1 | 5/2007 | Suzuki et al. |
| 2008/0255296 A1* | 10/2008 | Gibbons ................ B32B 7/06 524/528 |
| 2008/0276645 A1 | 11/2008 | Murray |
| 2010/0119745 A1* | 5/2010 | Nieto ................ B32B 7/02 428/35.7 |
| 2010/0221462 A1* | 9/2010 | Forsyth ................ B26F 1/24 428/34.1 |

FOREIGN PATENT DOCUMENTS

| | | |
|---|---|---|
| JP | S5519522 A | 2/1980 |
| JP | H1035694 A | 2/1998 |
| JP | 2003-103727 A | 4/2003 |
| JP | 2009078520 A | 4/2009 |
| JP | 2012045884 A | 3/2012 |
| WO | 00/01745 A1 | 1/2000 |
| WO | 2005/060899 A1 | 7/2005 |
| WO | WO2008057768 * | 5/2008 |
| WO | 2008/070190 A2 | 6/2008 |
| WO | 2009/117461 A1 | 9/2009 |

* cited by examiner

FLEXIBLE FILM COMPOSITION FOR HEAT SEALS AND CONTAINER WITH SAME

FIELD

The present disclosure is directed to heat sealable film structures for the production of a flexible container with frangible seals and hard seals.

BACKGROUND

Known are heat sealable films for the production of flexible containers with frangible seals. Flexible containers with frangible seals find utility as temporary storage vessels for items. The frangible seal can be opened manually (by hand) to release or mix the contents of the flexible container.

The art recognizes the need for improved heat sealable films for more versatile uses of flexible containers. Thus, the art recognizes the need for heat sealable films capable of producing both frangible seals and hard seals and simplified production processes for the same.

SUMMARY

The present disclosure is directed to compositions and films for producing heat seals. The compositions and films disclosed herein are advantageously used to produce structures with frangible heat seals, hard heat seals, or a combination of frangible heat seals and hard heat seals. The present disclosure is further directed to flexible containers containing frangible heat seals, and/or hard heat seals.

The present disclosure provides a flexible film structure that is heat sealable. In an embodiment, the heat sealable flexible film structure includes:
- a layer (A) comprising from 35 to 80 percent by weight of a propylene based plastomer or elastomer ("PBPE") and from 20 to 65 percent by weight of a low density polyethylene having a density in the range of from 0.915 g/cm³ to 0.935 g/cm³;
- a layer (B), adjacent to layer (A), comprising at least 50 percent by weight of a polyolefin-based polymer selected from
  - (i) a Ziegler-Natta catalyzed ethylene copolymer comprising repeating units derived from ethylene and one or more α-olefins having from 3 to 10 carbon atoms;
  - (ii) a metallocene-catalyzed ethylene copolymer comprising repeating units derived from ethylene and one or more α-olefins having from 3 to 10 carbon atoms;
  - (iii) a Ziegler-Natta-catalyzed ethylene homopolymer;
  - (iv) a metallocene-catalyzed ethylene homopolymer;
  - (v) a low density polyethylene (LDPE);
  - and combinations thereof; and
- an outermost layer (C) comprising a material having a melting point greater than 140° C. Weight percents are based on the total weight of the respective layer.

The heat sealable flexible film structure is capable of forming a heat seal. A hard seal is formed when two (A) layers are brought into contact with each other and exposed to a first range of sealing temperature and (ii) a frangible seal is formed when two (A) layers are brought into contact with each other and exposed to a second range of sealing temperature, the second temperature range being lower than the first temperature range.

The present disclosure provides a flexible container. In an embodiment, the flexible container includes a first film and a second film. Each film includes a heat sealable flexible film structure comprising:
- a seal layer (A) comprising from 35 to 80 percent of the PBPE and from 20 to 65 percent by weight of a low density polyethylene having a density in the range of from 0.915 g/cm³ to 0.935 g/cm³;
- a base layer (B) comprising at least 50 percent by weight of an ethylene-based polymer; and
- an outermost layer (C) comprising a material having a melting point greater than 140° C. Weight percents are based on the total weight of the respective layer. The films are arranged such that the layer (A) of each film is in contact with each other. The second film is superimposed on the first film to form a common peripheral edge. The flexible container includes a heat seal located along at least a portion of the common peripheral edge.

DETAILED DESCRIPTION

Figure 1:
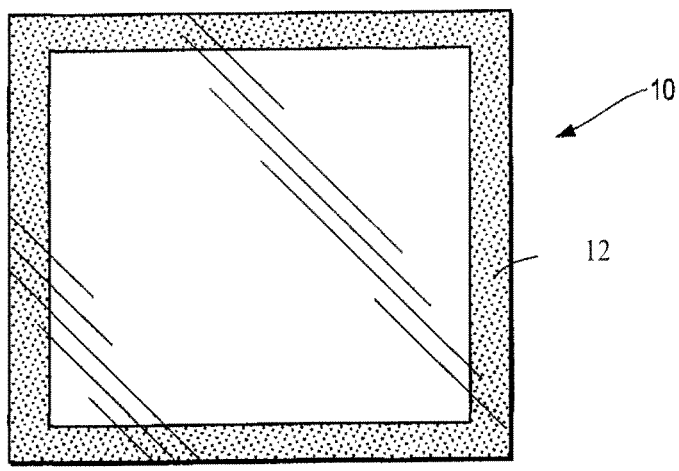
FIG. 1 is an elevation view of a flexible container in accordance with an embodiment of the present disclosure.

The present disclosure provides a heat sealable flexible film structure. In an embodiment, the heat sealable flexible film structure includes a layer (A), a layer (B), an outermost layer (C), and optional one or more additional layers.

A "heat sealable film structure," as used herein, is a film structure that forms a heat seal when subjected to a heat sealing procedure. A heat sealing procedure includes hot metal sealing jaws that are moved from an open position to a closed position. In the closed position, the hot metal jaws come into direct contact with the outermost layers of a film for a period of time (dwell time), a predetermined sealing pressure, and a predetermined sealing temperature. During the dwell time, heat is transferred through the outermost layer of the film to melt and fuse opposing inner seal layers to form a heat seal. Generally, the outermost layer has a higher melting temperature than the seal layer. As such, while the seal layer is melted to form a seal, the outermost layer of the film does not melt and does not stick, or does not substantially stick, to the sealing jaws. Surface treatments to the sealing jaw bars may be applied to further reduce stickiness effects to the films. After the sealing jaws reopen, the film is cooled to room temperature. The heat sealing procedure can be used to form the film into a desired shape—such as a bag, a pouch, a sachet, and a stand up pouch, for example.

In an embodiment, the hot metal jaws are a component of a form, fill, and seal device.

The heat seal can be a frangible seal or a hard seal. A "frangible seal," as used herein, is a heat seal that is manually separable (or peelable) without destruction of the film. A "hard seal," as used herein, is a heat seal that is not manually separable without destruction of the film. In general, a frangible seal is designed to be separable or openable with application of finger pressure or hand pressure to the seal. A hard seal is designed to remain intact with application of finger pressure or hand pressure to the seal.

The present heat sealable flexible film structure includes:
 the layer (A) which includes a blend of a propylene/ethylene copolymer and a low density polyethylene;
 the layer (B), which includes an ethylene-based polymer selected from a high density polyethylene, a linear low density polyethylene, and combinations thereof; and
 the outermost layer (C) which includes a material with a melting temperature greater than 140° C.

1. Layer (A)

The layer (A) includes a blend of a propylene based plastomer or elastomer ("PBPE") and a low density polyethylene (LDPE). In an embodiment, the layer (A) is a seal layer (A). A "propylene-based plastomer or elastomer" (or "PBPE") comprises at least one copolymer with at least 50 weight percent of units derived from propylene and at least about 5 weight percent of units derived from a comonomer other than propylene.

The PBPE is characterized as having substantially isotactic propylene sequences. "Substantially isotactic propylene sequences" means the sequences have an isotactic triad (mm) measured by $^{13}$C NMR of greater than 0.85, or greater than 0.90, or greater than 0.92, or greater than 0.93. Isotactic triads are known in the art and described in, for example, U.S. Pat. No. 5,504,172 and WO 2000/01745, which refer to the isotactic sequence in terms of a triad unit in the copolymer molecular chain determined by $^{13}$C NMR spectra.

The PBPE has a melt flow rate (MFR) in the range of from 0.1 to 25 g/10 minutes (min.), measured in accordance with ASTM D-1238 (at 230° C./2.16 Kg). All individual values and subranges from 0.1 to 25 g/10 min are included and disclosed herein; for example, the MFR can be from a lower limit of 0.1, 0.2, or 0.5, to an upper limit of 25, 15, 10, 8, or 5, g/10 min For example, when the PBPE is propylene/ethylene copolymer, it may have a MFR in the range of 0.1 to 10, or in the alternative, 0.2 to 10, g/10 min.

The PBPE has a crystallinity in the range of from at least 1 to 30 wt % (a heat of fusion of at least 2 to less than 50 Joules/gram (J/g)), all individual values and subranges thereof being included and disclosed herein. For example, the crystallinity can be from a lower limit of 1, 2.5, or 3, wt % (respectively, at least 2, 4, or 5 J/g) to an upper limit of 30, 24, 15 or 7, wt % (respectively, less than 50, 40, 24.8 or 11 J/g). For example, when the PBPE is propylene/ethylene copolymer, it may have a crystallinity in the range of from at least 1 to 24, 15, 7, or 5, wt % (respectively, at least 2 to less than 40, 24.8, 11, or 8.3 J/g). Crystallinity is measured via DSC method, as described below in the test methods section. The propylene/ethylene copolymer comprises units derived from propylene and polymeric units derived from ethylene comonomer and optional $C_4$-$C_{10}$ α-olefin. Exemplary comonomers are $C_2$, and $C_4$ to $C_{10}$ α-olefins; for example, $C_2$, $C_4$, $C_6$ and $C_8$ α-olefins (ethylene is considered an α-olefin in this disclosure).

In an embodiment, the PBPE comprises from 1 wt % to 40 wt % ethylene comonomer. All individual values and subranges from 1 wt % to 40 wt % are included and disclosed herein; for example, the comonomer content can be from a lower limit of 1, 3, 4, 5, 7 or 9, wt % to an upper limit of 40, 35, 30, 27, 20, 15, 12 or 9, wt %. For example, the propylene/ethylene copolymer comprises from 1 to 35 wt %, or, in alternative, from 1 to 30, 3 to 27, 3 to 20, or from 3 to 15, wt %, of ethylene comonomer.

In an embodiment, the PBPE has a density from 0.850 g/cc, or 0.860 g/cc, or 0.865 g/cc to 0.900 g/cc.

In an embodiment, the PBPE has a molecular weight distribution (MWD), defined as weight average molecular weight divided by number average molecular weight ($M_w/M_n$) of 3.5 or less; in the alternative 3.0 or less; or in another alternative from 1.8 to 3.0.

Such PBPE types of polymers are further described in U.S. Pat. Nos. 6,960,635 and 6,525,157, incorporated herein by reference. Such PBPE is commercially available from The Dow Chemical Company, under the tradename VERSIFY, or from ExxonMobil Chemical Company, under the tradename VISTAMAXX.

In an embodiment, the PBPE is further characterized as comprising (A) between 60 and less than 100, between 80 and 99, or between 85 and 99, wt % units derived from propylene, and (B) between greater than zero and 40, or between 1 and 20, 4 and 16, or between 4 and 15, wt % units derived from ethylene and optionally one or more $C_{4-10}$ α-olefin; and containing an average of at least 0.001, at least 0.005, or at least 0.01, long chain branches/1000 total carbons, wherein the term long chain branch refers to a chain length of at least one (1) carbon more than a short chain branch, and wherein short chain branch refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. The maximum number of long chain branches in the propylene/ethylene copolymer interpolymer does not exceed 3 long chain branches/1000 total carbons.

In an embodiment, the PBPE copolymer has a melt temperature (Tm) from 55° C. to 146° C.

A nonlimiting example of a suitable propylene/ethylene copolymer is VERSIFY 3200, available from The Dow Chemical Company.

The blend of layer (A) also includes low density polyethylene (LDPE). The LDPE has a melt index (MI) from 0.2 g/10 min, or 0.5 g/10 min to 10 g/10 min, or 20 g/10 min, or 50 g/10 min.

The LDPE has a density from 0.915 g/cc, to 0.925 g/cc, or 0.930 g/cc, 0.935 g/cc, or 0.940 g/cc.

In an embodiment, the LDPE is made in an autoclave high pressure polymerization process, a tubular high pressure polymerization process, or combinations thereof. In a further embodiment, the LDPE excludes linear low density polyethylene and high density polyethylene.

The blend of layer (A) includes from 35 wt % to 80 wt % of the PBPE and from 20 wt % to 65 wt % of the LDPE. Weight percent is based on total weight of the layer (A).

In an embodiment, the layer (A) includes 75 wt % PBPE and 25 wt % LDPE. The 75/25 blend further has a density from 0.89 g/cc to 0.90 g/cc, and a melt index from 3.0 g/10 min to 4.0 g/10. In a further embodiment, the 75/25 blend has a density of 0.895 g/cc and a melt index of 3.8 g/10 min.

In an embodiment, the layer (A) includes 50 wt % PBPE and 50 wt % LDPE. The 50/50 blend further has a density from 0.90 g/cc to 0.91 g/cc, and a melt index from 1.0 g/10 min to 2.0 g/10 min In a further embodiment, the 50/50 blend has a density of 0.902 g/cc and a melt index of 1.2 g/10 min.

The present PBPE may comprise two or more embodiments disclosed herein.

The present layer (A) may comprise two or more embodiments disclosed herein.

2. Layer (B)

Each film includes a layer (B). In an embodiment, the layer (B) is a base layer (B). The layer (B) includes at least 50% by weight of the layer (B) of an olefin-based polymer selected from: (i) a Ziegler-Natta catalyzed ethylene copolymer comprising repeating units derived from ethylene and one or more α-olefins having from 3 to 10 carbon atoms; (ii) a metallocene-catalyzed ethylene copolymer comprising repeating units derived from ethylene and one or more α-olefins having from 3 to 10 carbon atoms; (iii) a Ziegler-Natta-catalyzed ethylene homopolymer; (iv) a metallocene-catalyzed ethylene homopolymer; (v) a low density polyethylene (LDPE); and combinations thereof. In an embodiment, the layer (B) is selected from a high density polyethylene (HDPE), a linear low density polyethylene (LLDPE), low density polyethylene (LDPE), and combinations thereof.

In an embodiment, the layer (B) is a linear low density polyethylene. Linear low density polyethylene ("LLDPE") comprises, in polymerized form, a majority weight percent of units derived from ethylene, based on the total weight of the LLDPE. In an embodiment, the LLDPE is an interpolymer of ethylene and at least one ethylenically unsaturated comonomer. In one embodiment, the comonomer is a $C_3$-$C_{20}$ α-olefin. In another embodiment, the comonomer is a $C_3$-$C_8$ α-olefin. In another embodiment, the $C_3$-$C_8$ α-olefin is selected from propylene, 1-butene, 1-hexene, or 1-octene. In an embodiment, the LLDPE is selected from the following copolymers: ethylene/propylene copolymer, ethylene/butene copolymer, ethylene/hexene copolymer, and ethylene/octene copolymer. In a further embodiment, the LLDPE is an ethylene/octene copolymer.

In an embodiment, the LLDPE has a density in the range from 0.865 g/cc to 0.940 g/cc, or from 0.90 g/cc to 0.94 g/cc. The LLDPE preferably has a melt index (MI) from 0.1 g/10 min to 10 g/10 min, or 0.5g/10 min to 5g/10 min LLDPE can be produced with Ziegler-Natta catalysts, or single-site catalysts, such as vanadium catalysts and metallocene catalysts. In an embodiment, the LLDPE is produced with a Ziegler-Natta type catalyst. LLDPE is linear and does not contain long chain branching and is different than low density polyethylene ("LDPE") which is branched or heterogeneously branched polyethylene. LDPE has a relatively large number of long chain branches extending from the main polymer backbone. LDPE can be prepared at high pressure using free radical initiators, and typically has a density from 0.915 g/cc to 0.940 g/cc.

In an embodiment, the LLDPE is a Ziegler-Natta catalyzed ethylene and octene copolymer and has a density from 0.90 g/cc to 0.93 g/cc, or 0.92 g/cc. Nonlimiting examples of suitable Ziegler-Natta catalyzed LLDPE are polymers sold under the tradename DOWLEX, available from The Dow Chemical Company, Midland, Mich.

Nonlimiting examples of suitable LLDPE for layer (B) include DOWLEX 2045B and DOWLEX 2107B available from The Dow Chemical Company.

In an embodiment, the layer (B) is a high density polyethylene (HDPE). The HDPE is an ethylene homopolymer or an ethylene-based interpolymer. The ethylene-based interpolymer comprises, in polymerized form, a majority weight percent ethylene based on the weight of the interpolymer, and one or more comonomers. The HDPE has a density from 0.940 g/cc, or greater than 0.940 g/cc. In an embodiment, the HDPE has a density from 0.940 g/cc to 0.970 g/cc, or from 0.950 g/cc to 0.960 g/cc, or 0.956 g/cc. In one embodiment, the HDPE has a melt index from 0.1 g/10 min to 10 g/10 min or from 0.5 g/10 min to 5 g/10 min The HDPE can include ethylene and one or more $C_3$-$C_{20}$ α-olefin comonomers. The comonomer(s) can be linear or branched. Nonlimiting examples of suitable comonomers include propylene, 1-butene, 1-pentene, 4-methyl-1-pentene, 1-hexene, and 1-octene. The HDPE can be prepared with either Ziegler-Natta, chromium-based, constrained geometry or metallocene catalysts in slurry reactors, gas phase reactors or solution reactors.

In an embodiment, the HDPE is an ethylene/α-olefin copolymer with a density from about 0.95 g/cc to 0.96 g/cc, a melt index from 1.5 g/10 min to 2.5 g/10 min.

In an embodiment, the HDPE is an ethylene/α-olefin copolymer and has a density from 0.940 g/cc to 0.970 g/cc, or 0.956 g/cc, a melt index from 0.1 g/10 min to 10 g/10 min In an embodiment, the HDPE has a density from 0.94 g/cc to 0.962 g/cc and a melt index from 0.5 g/10 min to 1.0 g/10 min A nonlimiting example of suitable HDPE for base layer (B) includes ELITE 5960G available from The Dow Chemical Company.

The HDPE may comprise two or more of the foregoing embodiments.

In an embodiment, the layer (B) is a Low density polyethylene (LDPE). The LDPE may advantageously have a melt index (MI) from 0.2 g/10 min, or 0.5 g/10 min to 10 g/10 min, or 20 g/10 min, or 50 g/10 min The LDPE may advantageously have a density from 0.915 g/cc, to 0.925 g/cc, or 0.930 g/cc, 0.935 g/cc, or 0.940 g/cc.

In an embodiment, the LDPE is made in an autoclave high pressure polymerization process, a tubular high pressure polymerization process, or combinations thereof. In a further embodiment, the layer (B) may exclude linear low density polyethylene and high density polyethylene.

In an embodiment, the layer (B) is directly adjacent to layer (A). The term "directly adjacent," as used herein, is intimate contact of layer (A) to layer (B) whereby no intervening layers or no intervening structures are located between layer (A) and layer (B).

3. Outermost Layer (C)

The heat sealable flexible film structure includes an outermost layer (C). The outermost layer (C) is composed of a polymer or other material having a melt temperature greater than 140° C. In an embodiment the outermost layer (C) has a melt temperature from greater than 150° C. to 200° C.

In an embodiment, the outermost layer (C) is added as a coating, or may be added as a second film using a lamination process with an optional adhesive to create a cohesive single film structure.

In an embodiment, the outermost layer (C) is formed using a coextrusion process where layers A, B and C are co-extruded in a single process. A coextrusion adhesive layer may be advantageously used as an adjacent layer to the outermost layer (C), thus creating a heat sealable flexible film structure with at least 4 layers.

In an embodiment, outermost layer (C) is a coating, such as a spray coating, a dip coating, or a brush coating. Nonlimiting examples of suitable coating for outermost layer (C) include a varnish or a lacquer with high temperature resistance (i.e., greater 140° C. melt temperature).

Nonlimiting examples of suitable material for outermost layer (C) include poly(ethylene terephthalate) (PET), polyamide, propylene homopolymer, and aluminum foil.

In an embodiment, the outermost layer (C) is a PET film.

4. Inner Layer (D)

The heat sealable flexible film structure may include one or more optional inner layers. It is understood that the heat sealable flexible film structure may include one, two, three or more inner layer(s) (D), layers (D) being the same or different. In an embodiment, the heat sealable flexible film structure includes an inner layer (D). Inner layer (D) is disposed between base layer (B) and outermost layer (C) with layer (A) directly adjacent to layer (B). In an embodiment, inner layer (D) includes an ethylene-based polymer selected from a high density polyethylene (HDPE), a linear low density polyethylene (LLDPE), a low density polyethylene (LDPE) and combinations thereof. Inner layer (D) may be any HDPE or LLDPE as disclosed for base layer (B) above.

Layer (B) and inner layer (D) may be the same or different. In an embodiment, layer (B) and inner layer (D) are the same composition. In an alternate embodiment, layer (B) and inner layer (D) are composed of are different compositions.

In an embodiment, the inner layer (D) is a barrier layer. Suitable polymers for barrier layer include HDPE, LLDPE, LDPE, ethylene vinyl alcohol copolymer (EVOH), maleic anhydride-modified polyethylene, polyamide (PA), cyclic olefin copolymer (COC), ethylene vinyl acetate (EVA), propylene homopolymer (PP), and vinylidene chloride polymer, and combinations thereof.

In many commercial applications two heat sealable flexible films are used together such that the second film is superimposed on the first film so that the seal layer (A) of the first film is in contact with the seal layer (A) of the second film. In other applications a single film or a single sheet may be folded such that two surfaces of the same seal layer (A) are in contact with each other.

The heat sealable flexible film structure forms (i) a hard seal when two (A) layers are brought into contact with each other and exposed to a first range of sealing temperature and (ii) a frangible seal when two (A) layers are brought into contact with each other and exposed to a second range of sealing temperature, the second range being lower than the first range. In an embodiment, the difference between an upper end of the second range of sealing temperature and a lower end of the second range of sealing temperature is at least 30° C.

The heat sealable flexible film structure forms a hard seal when at least two of the following three parameters are met (preferably all three): (i) a sealing pressure of greater than or equal 3.0 N/mm$^2$; (ii) a dwell time of greater than or equal to 1.5 seconds; and (iii) a sealing temperature greater than or equal to 120° C.

In an embodiment, the frangible seal is formed when at least two of the following three parameters are met: (i) a sealing pressure less than 3.0 N/mm$^2$, (ii) a dwell time less than 1.5 seconds, and a sealing temperature less than 120° C.

In this way, the heat sealable flexible film structure advantageously enables production of either a frangible seal or a hard seal depending on the processing conditions.

In an embodiment, layers (A), (B), and layer (D) are formed by way of coextrusion. Outermost layer (C) is subsequently laminated to the coextruded structure A/B/ (optional D). This forms heat sealable flexible film structure A/B/D/C with coextruded layer structure A/B/D and laminate outermost layer (C).

In an embodiment, layers (A), (B), (D), and outermost layer (C) are formed by way of coextrusion. This forms heat sealable flexible film structure with coextruded layer structure A/B/D/C.

In an embodiment, layers (A), (B), and layer (D) are formed by way of coextrusion. Outermost layer (C) is coated onto layer (D). This forms heat sealable flexible film structure A/B/D/C with coextruded layer structure A/B/D and a coating of outermost layer (C).

In an embodiment, the heat sealable flexible film structure includes:

Layer (A) that is a seal layer (A) comprising from 70 wt % to 80 wt % propylene/ethylene copolymer and from 30 wt % to 20 wt % low density polyethylene;

Layer (B) that is a base layer (B) comprising an ethylene-based polymer selected from a high density polyethylene, a linear low density polyethylene, and a low density polyethylene;

Layer (D) that is an inner layer (D) comprising an ethylene-based polymer selected from a high density polyethylene and a linear low density polyethylene; and Layer (C) that is an outermost layer (C) composed of a poly(ethylene terephthalate) film.

In an embodiment, each heat sealable flexible film structure has the following configuration:

a seal layer (A) with a thickness from 5 microns, or 10 microns, or less than 15 microns, to 20 microns, or 25 microns, or than 30 microns;

a base layer (B) with a thickness from 10 microns to 100 microns;

an inner layer (D) with a thickness from 10 microns to 100 microns; and an outermost layer (C) with a thickness from 10 microns to 40 microns. In a further embodiment, the total thickness for the heat sealable flexible film structure is from 60 microns to 80 microns, or 70 microns.

In an embodiment, the heat sealable flexible film structure is processed via a cast extrusion process or a blown film extrusion process.

In an embodiment, the heat sealable flexible film structure includes one or more layers A, B, C, or D that are foamed.

In an embodiment, a flexible container is provided, the flexible container comprising the heat sealable flexible film structure.

The present heat sealable flexible film structure may comprise two or more embodiments disclosed herein.

5. Flexible Container

The present disclosure provides a flexible container. In an embodiment, the flexible container includes a first film and a second film. Alternatively, the flexible container can be formed from a single sheet that is folded, the fold defining the first film and the second film. Each of the first film and the second film includes the heat sealable flexible film structure as disclosed above. In particular the first film and the second film each include:

a seal layer (A) comprising a blend of a PBPE and a low density polyethylene;

a base layer (B) comprising an ethylene-based polymer selected from a high density polyethylene, a linear low density polyethylene, and a low density polyethylene; and an outermost layer (C) comprising a material having a melt temperature greater than 140° C. The films are arranged such that the second film is superimposed on the first film to form a common peripheral edge and the seal layer (A) of each film is in contact with each other. The flexible container includes a heat seal along at least a portion of the common peripheral edge. The flexible container may be a pouch, a sachet, a stand-up pouch, and a form-fill-and seal pouch.

In an embodiment, the seal layer (A) of the flexible container includes from 35 to 80 wt % of the "PBPE" and from 20 to 65 wt % of a low density polyethylene having a density in the range of from 0.915 g/cm$^3$ to 0.935 g/cm$^3$. Weight percent is based on total weight of layer (A).

In an embodiment, the base layer (B) includes at least 50 wt % of an ethylene-based polymer selected from LLDPE, HDPE, and LDPE. Weight percent is based on total weight of layer (B).

In an embodiment, the flexible container includes a hard seal and a frangible seal. In a further embodiment, the hard seal is located along at least one peripheral edge and the frangible seal is located in an area other than along the peripheral edge.

In an embodiment, the entire peripheral edge of the flexible container is a hard seal. The flexible container also includes a frangible seal located in an area other than the peripheral edge.

In an embodiment, the flexible container is made from a single sheet. The first film and the second film each is a component of the same single flexible sheet. The single flexible sheet is folded to superimpose the second film onto the first film, mating the seal layers (A) and forming a common peripheral edge as discussed above. The single sheet flexible container may be produced by way of a form, fill, and seal process.

The peripheral heat seal of the flexible container defines a container interior. In an embodiment, the flexible container further includes a frangible seal that traverses the container interior. The frangible seal defines two compartments. In an embodiment, the flexible container includes two or more frangible seals that traverse the container interior to define three or more compartments.

In an embodiment as shown in FIG. 1, a flexible container 10 is shown. The flexible container 10 is formed with the first film and the second film as described above. The flexible container 10 includes a peripheral heat seal 12. The peripheral heat seal 12 is a hard seal formed when at least two of the following three (preferably all three) of the following heat seal conditions are met: (i) a sealing pressure greater than or equal to 3.0 N/mm$^2$, (ii) a dwell time greater than or equal to 1.5 seconds, and (iii) a sealing temperature greater than or equal to 120° C.

Figure 2:
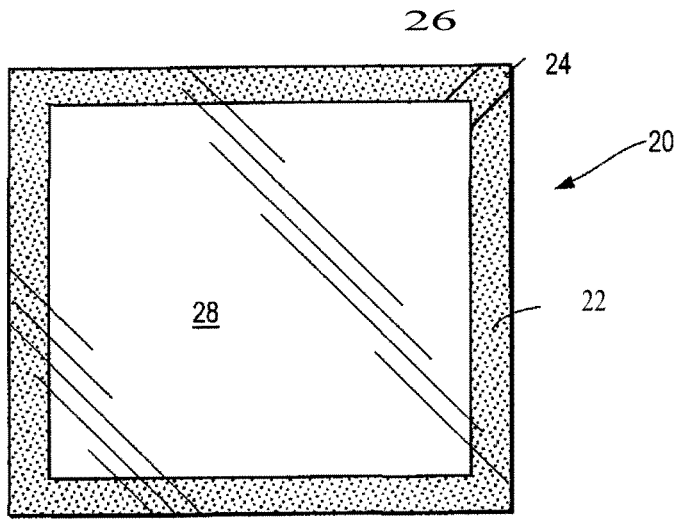
FIG. 2 is an elevation view of a flexible container in accordance with an embodiment of the present disclosure.

In an embodiment and as shown in FIG. 2, a flexible container 20 is shown. The flexible container 20 is formed from the first film and the second film as disclosed above. The flexible container 20 includes a peripheral hard seal portion 22 and a peripheral frangible seal portion 24. The peripheral frangible seal portion 24 is formed when at least two of the following heat seal conditions are met: (i) a sealing pressure less than 3.0 N/mm$^2$, (ii) a dwell time less than 1.5 seconds, and (iii) a sealing temperature less than 120° C. and combinations thereof.

In an embodiment, the flexible container 20 has two or more peripheral frangible seals on respective two or more sides of the container.

In an embodiment, the flexible container 20 has a rectangular shape. The frangible seal portion 24 is located at a corner 26 of the flexible container 20. The frangible seal portion 24 can be separated with hand pressure or with finger pressure while the peripheral hard seal portion 22 remains intact. In this way, the contents of the flexible container 20 can be removed from the container interior 28 by way of egress through separated (or opened) frangible seal portion 24. The size and position of the frangible seal portion 24 can be located at one or more locations along the peripheral heat seal 12.

In an embodiment, the frangible seal portion 24 can be shaped or otherwise formed into a nozzle.

In an embodiment, the flexible container 20 may include a secondary frangible seal proximate to the frangible seal portion 24 to prevent the frangible seal portion from opening during transportation and handling.

Figure 3:
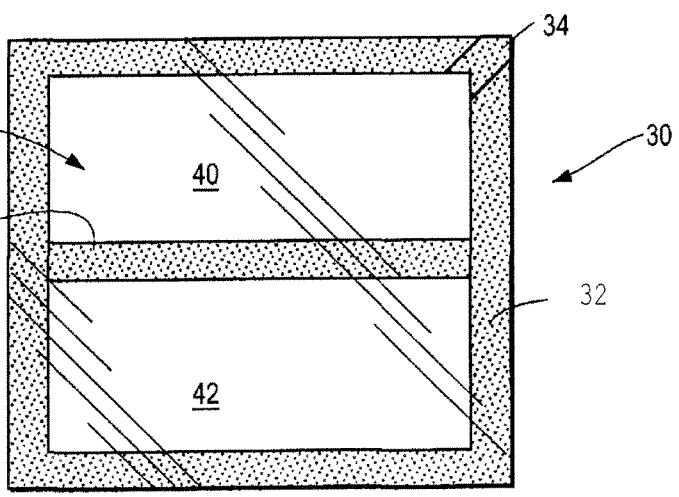
FIG. 3 is an elevation view of a flexible container in accordance with an embodiment of the present disclosure.

In an embodiment, a flexible container 30 is provided as shown in FIG. 3. The flexible container 30 includes a peripheral heat seal 32 that is a hard seal and may optionally include a peripheral frangible seal portion 34. The peripheral heat seal 32 as a hard seal is formed when at least two (preferably all three) heat seal conditions are met: (i) a sealing pressure greater than or equal to 3.0 N/mm$^2$ (ii) for a dwell time greater than or equal to 1.5 seconds, and (iii) a sealing temperature greater than 120° C. The peripheral heat seal 32 defines a container interior 36. A frangible seal 38 extends across the container interior 36. The shape and size of container interior 36 may be varied based on the type of content and package design.

The frangible seal 38 is formed when at least two (preferably all three) heat seal conditions are met: (i) sealing pressure less than 3.0 N/mm$^2$, (ii) a dwell time less than 1.5 seconds, and (iii) a sealing temperature less than 120° C. FIG. 3 shows the frangible seal 38 extending from one side of the peripheral heat seal 32 to an opposing side of the peripheral heat seal 32 thereby traversing the container interior and defining a first compartment 40 and a second compartment 42. The frangible seal 38 may formed into different shapes and configurations. The flexible container 30 may include one or more optional additional frangible seals, each similar to frangible seal 38 to define additional compartments.

The compartments 40, 42 are sealed to store respective contents in isolation or otherwise separated from the other compartment. When ready for use, a user separates or otherwise peels open the frangible seal 38 to combine or otherwise mix the content of compartment 40 with the content of compartment 42. The mixture may then be removed from the container 30 interior by rupturing peripheral frangible seal 34.

In an embodiment, the flexible container is in the form of one or more of the following: a pouch, a sachet, and a stand up pouch, and the peripheral heat seal is a combination of a hard seal and a frangible seal.

In an embodiment, the flexible container is in the form of a pouch, a sachet, a stand up pouch and the peripheral heat seal defines the container interior. The flexible container further includes a frangible seal internal to the peripheral heat seal and defining a first compartment and a second or more compartments.

Nonlimiting examples of contents suitable for containment by flexible containers 10, 20, 30 include comestibles (beverages, soups, cheeses, cereals), liquids, shampoos, oils, waxes, emollients, lotions, moisturizers, medicaments, pastes, surfactants, gels, adhesives, suspensions, solutions, enzymes, soaps, cosmetics, liniments, flowable particulates, and combinations thereof.

The present flexible container may comprise two or more embodiments disclosed herein.

Definitions

Unless stated to the contrary, implicit from the context, or customary in the art, all parts and percents are based on weight, and all test methods are current as of the filing date of this disclosure.

The term "composition," as used herein, includes a mixture of materials which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The term, "ethylene-based polymer," as used herein, refers to a polymer that comprises, in polymerized form, a majority amount of ethylene monomer (based on the weight of the polymer), and optionally may comprise one or more comonomers.

The term "propylene-based polymer," as used herein refers to a polymer that comprises, in polymerized form, a majority amount of propylene monomer (based on weight of the polymer), and optionally may comprise one or more comonomers.

The term "propylene/ethylene copolymer," as used herein, refers to a polymer that comprises, in polymerized form, a majority amount of propylene monomer (based on the weight of the polymer), and a minority amount of ethylene comonomer and optionally may comprise one or more additional comonomers.

Test Methods

Density is measured in accordance with ASTM D792.

Gel Permeation Chromatography (GPC)

Conventional GPC measurements are used to determine the weight-average (Mw) and number-average (Mn) molecular weight of the polymer, and to determine the MWD (=Mw/Mn). "Samples are analyzed with a high-temperature GPC instrument (Polymer Laboratories, Inc. model PL220).

The method employs the well-known universal calibration method, based on the concept of hydrodynamic volume, and the calibration is performed using narrow polystyrene (PS) standards, along with four Mixed A 20 μm columns (PLgel Mixed A from Agilent (formerly Polymer Laboratory Inc.)) operating at a system temperature of 140° C. Samples are prepared at a "2 mg/mL" concentration in 1,2,4-trichlorobenzene solvent. The flow rate is 1.0 mL/min, and the injection size is 100 microliters.

As discussed, the molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in Journal of Polymer Science, Polymer Letters, Vol. 6, (621) 1968) to derive the following equation:

$$M\text{polyethylene} = a * (M\text{polystyrene})^b.$$

In this equation, a=0.4316 and b=1.0 (as described in Williams and Ward, *J. Polym. Sc., Polym. Let.,* 6, 621 (1968)). Polyethylene equivalent molecular weight calculations were performed using VISCOTEK TriSEC software Version 3.0.

Differential Scanning Calorimetry (DSC)

Differential Scanning calorimetry (DSC) is used to measure crystallinity in the polymers (e.g., ethylene-based (PE) polymers). About 5 to 8 mg of polymer sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for PP). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)×100 (for PE)).

Unless otherwise stated, melting point(s) ($T_m$) of each polymer is determined from the second heat curve (peak Tm), and the crystallization temperature ($T_c$) is determined from the first cooling curve (peak Tc).

Melt flow rate, or MFR is measured in accordance with ASTM D 1238, Condition 230° C./2.16 kg.

Melt index, or MI, is measured in accordance with ASTM D 1238, Condition 190° C./2.16 kg.

Heat Seal Strength

Heat seal strength is a measure of the force required to separate a heat seal. Heat seal measurements on the film are performed on a commercial tensile testing machine according to ASTM F-88 (Technique A). The force required to separate a test strip of material identifies the mode of specimen failure. Heat seal strength is relevant to the opening force and package integrity.

Prior to cutting, the first film and the second film are conditioned for a minimum of 40 hours at 23° C. (±2° C.) and 50% (±5%) R.H. (Relative Humidity) in accordance with ASTM D-618 (procedure A). The films are then cut from the three-layer coextruded laminated film in the machine direction to a length of approximately 11 inches and a width of approximately 8.5 inches. The first film is heat sealed to the second film across the machine direction on a J&B Hot Tack Tester over a range of temperatures under the following conditions:

Sealing Pressure: 0.275 N/mm²
Sealing Dwell Time: 0.5 seconds

The temperature range is approximately given by the Hot Tack Range (i.e. the temperature range over which at least a minimum hot tack seal is achieved and prior to the burn-through temperature).

The sealed films are conditioned for a minimum of 3 hours at 23° (±2° C.) and 50% R.H (±5%) prior to cutting into one inch wide strips. These strips are then further conditioned for a minimum of 21 hours at 23° (±2° C.) and 50% R.H (±5%) prior to testing.

For testing, the strips are loaded into the grips of a tensile testing machine at an initial separation of 2 inches (50.8 mm) and pulled at a grip separation rate of 10 inches/min at 23° (±2° C.) and 50% R.H (±5%). The strips are tested unsupported. Six replicate tests are performed for each sealing temperature. The data reported is peak load, strain at peak load and failure mode.

Some embodiments of the present disclosure will now be described in detail in the following Examples.

EXAMPLES

1. Materials

Materials for inventive examples and comparative samples are provided in Table 1 below.

TABLE 1

Polyolefin resins.

| Resin | Commercial Name | Type | I2 (g/10 min) | Density (g/cm$^3$) |
|---|---|---|---|---|
| Resin 1 | Elite 5960G | HDPE | 0.85 | 0.962 |
| Resin 2 | Dowlex 2045B | LLDPE | 1.00 | 0.920 |
| Resin 3 | Dowlex 2107B | LLDPE | 2.6 | 0.917 |
| Resin 4 | LDPE 320E | LDPE | 1.0 | 0.925 |
| Resin 5 | Blend 1 | 75% propylene-ethylene copolymer* + 25% LDPE | 3.8 | 0.895 |
| Resin 6 | Blend 2 | 50% propylene-ethylene copolymer* + 50% LDPE | 1.2 | 0.902 |
| Resin 7 | SEALUTION™ 210 | Commercial Polyolefin based peal polymer | 1.5 | 0.900 |

*Propylene-ethylene copolymer is a PBPE with a MWD of about 2.9, a heat of fusion of about 50 J/g, an MFR of 8 g/10 min, and a density of 0.876 g/cc.

The resins of Table 1 are coextruded to form coextruded structures that are prepared by blown film extrusion. Blown film extrusion consists of four main steps:

1. The polymer material starts in a pellet form, which are successively compacted and melted to form a continuous, viscous liquid. This molten plastic is then forced, or extruded, through an annular die.
2. Air is injected through a hole in the center of the die, and the pressure causes the extruded melt to expand into a bubble. The air entering the bubble replaces air leaving it, so that even and constant pressure is maintained to ensure uniform thickness of the film.
3. The bubble is pulled continually upwards from the die and a cooling ring blows air onto the film. The film can also be cooled from the inside using internal bubble cooling. This reduces the temperature inside the bubble, while maintaining the bubble diameter.
4. After solidification at the frost line, the film moves into a set of nip rollers which collapse the bubble and flatten it into two flat film layers. The puller rolls pull the film onto windup rollers. The film passes through idler rolls during this process to ensure that there is uniform tension in the film. Between the nip rollers and the windup rollers, the film may pass through a treatment centre, depending on the application. During this stage, the film may be slit to form one or two films, or surface treated.

The coextruded structures are shown in Table 2 below.

TABLE 2

Coextruded structures

| Sample # | Inner Layer (D) | Base Layer (B) | Seal layer (A) | Thickness (microns) Total | Thickness (microns) Seal layer (A) |
|---|---|---|---|---|---|
| 1 | 33% Resin 1 | 34% Resin 2 | 33% Resin 5 | 70 | 23 |
| 2 | 33% Resin 1 | 52% Resin 2 | 15% Resin 5 | 70 | 10 |
| 3 | 33% Resin 1 | 34% Resin 3 | 33% Resin 5 | 70 | 23 |
| 4 | 33% Resin 4$^{1)}$ | 50% Resin 4$^{2)}$ | 16.7% Resin 7 | 90 | 15 |
| 5 | 33% Resin 1 | 34% Resin 2 | 33% Resin 6 | 70 | 23 |
| 6 | 33% Resin 1 | 34% Resin 1 | 33% Resin 5 | 70 | 23 |

$^{1)}$contains 8% white MB (60% TiO2)
$^{2)}$contains 1000 ppm erucamide and 10% white MB (60% TiO2)

The heat sealable flexible film structures are produced by laminating a PET film (i.e., outermost layer C) onto each of the coextruded structures of Table 2 (other than sample 4). The 12 micron PET film (outermost layer C) is laminated to layer D of the coextruded structure using 2 to 3 g/m$^2$ of an adhesive layer composed of polyurethane (MORFREE MF 970/Cr-137).

(In case of sample #4 the film was sealed to itself (i.e. not a laminate). The laminations are oven-cured to completely cure the adhesive and form the heat sealable flexible film structures with layer configuration A/B/D/C. The final heat sealable flexible film structures with structure A/B/D/C are denoted as F1, F2, F3, F5, and F6 (numerals corresponding to the sample number of Table 2). Laminates F1, F2, F3, F5, and F6 have a total thickness of 82 microns. Once the outermost PET film is laminated to the coextruded structures the final heat sealable flexible film structures are formed. Outermost layer (C) enables higher sealing temperature (120° C. to 170° C.) to be applied to the structures without burning or sticking to the heat seal device.

Table 3 provides three separate heat seal conditions used to evaluate the structures.

TABLE 3

Heat Seal Conditions

| Heat Seal Conditions | ASTM F88 | Condition 1 | Condition 2 |
|---|---|---|---|
| Equipment | J&B Hot Tack Tester | J&B Hot Tack Tester | J&B Hot Tack Tester |

TABLE 3-continued

| Heat Seal Conditions | | | |
|---|---|---|---|
| Sealing (dwell) time (seconds) | 0.5 | 0.5 | 1.5 |
| Sealing pressure (N/mm$^2$) | 0.275 | 3.0 | 3.0 |
| Sealing temp range (° C.) | 70-170 | 80-140 | 80-140 |

Figure 4:
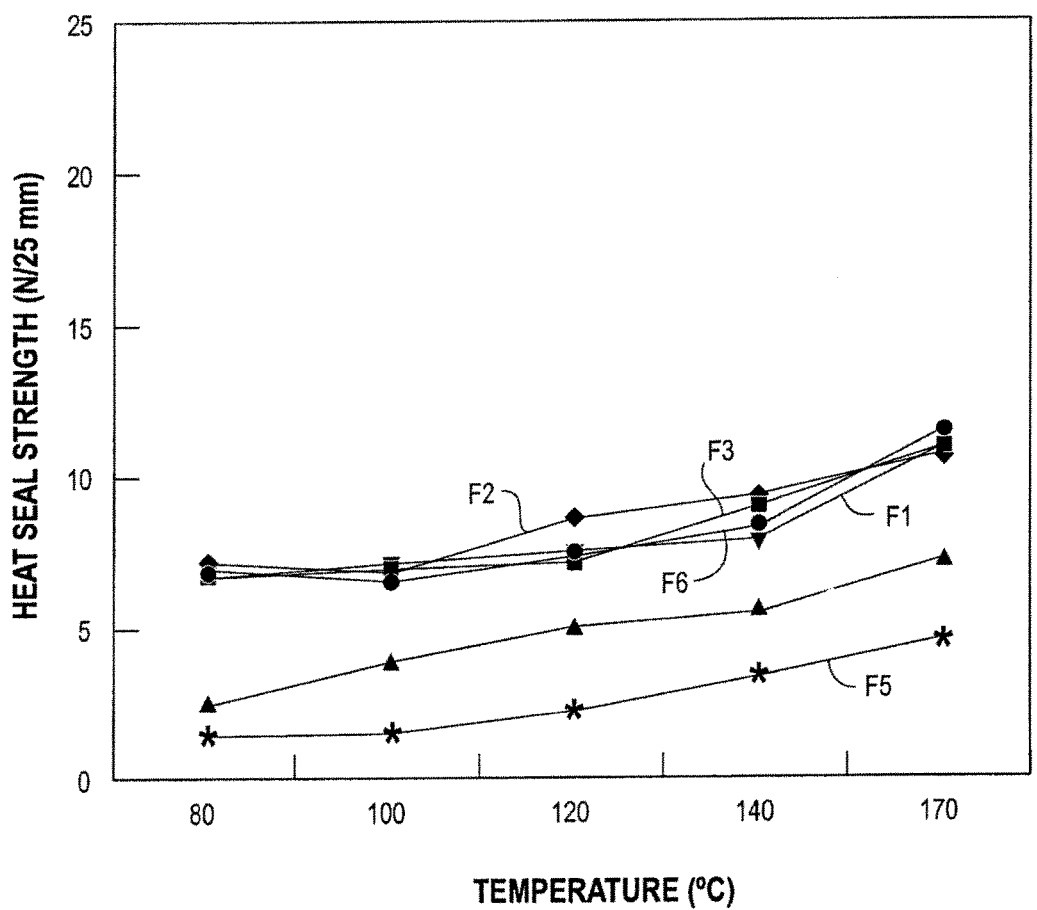
FIG. 4 shows heat seal curves for heat sealable flexible film structures in accordance with embodiments of the present disclosure.

FIG. 4 shows heat seal curves for heat seals produced in accordance with Condition ASTM F-88 for laminates F1, F2, F3, F5 and F6.

The curves in FIG. 4 show that laminates F1, F2, F3 and F6, produced using resin 5 as sealant layer (A) and resins 1, 2 and 3 as base layer (B) exhibit similar characteristics. The laminate F5 (using resin 6 as sealant layer) shows the lowest seal strength. All five laminates, F1, F2, F3, F5, and F6 exhibit cohesive failure (frangible seal) within sealant layers. At heat seal temperature less than 120° C., the seal layer (A) produces frangible seals. FIG. 4 also shows that even at temperatures greater than 120° C., the seal layer (A) continues to produce frangible seals when 0.275 N/mm$^2$ sealing pressure is applied.

Figure 5:
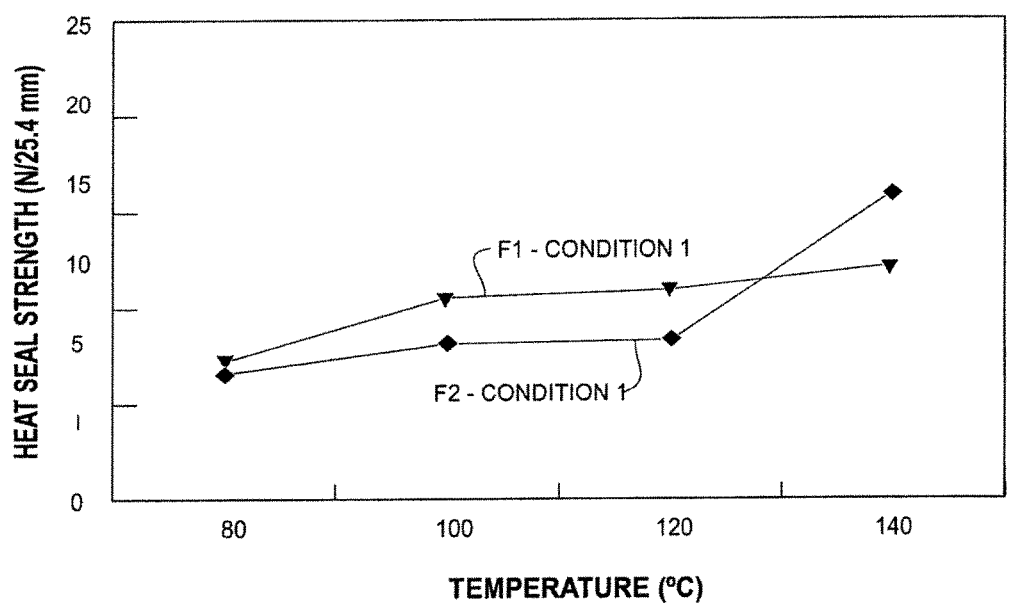
FIG. 5 shows heat seal curves for heat sealable flexible film structures in accordance with embodiments of the present disclosure.

FIG. 5 shows heat seal curves for heat seals produced according to Condition 1 and using heat sealable flexible film structures F1 and F2 Laminates F1 and F2 form heat seals using a sealing (dwell) time of 0.5 sec. and a sealing pressure of 3.0 N/mm$^2$ The formulations of laminates F1 and F2 differ only on the thickness of the seal layer (A). For F1, seal layer (A) is 23 microns thick. For F2, seal layer (A) is 10 microns thick. Laminate F1 exhibits cohesive failure (frangible seal) at sealing temperatures 80° C., 100° C., 120° C. and 140° C.

Laminate F2 exhibits cohesive failure (frangible seal) at sealing temperatures 80° C., 100° C. and 120° C. These results indicate that at 140° C., the thinner seal layer in F2 is totally or partially removed from some seal areas and some hard seal areas are formed, even with dwell time of 0.5 seconds.

Figure 6:
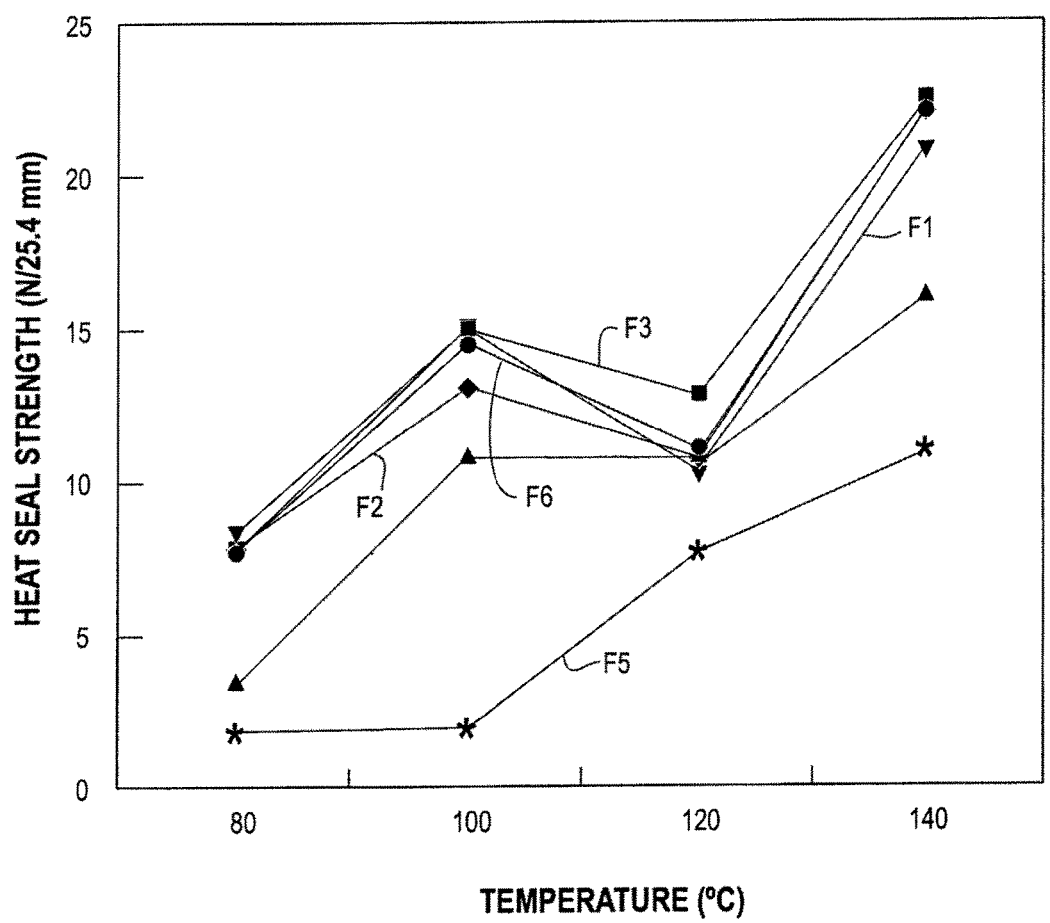
FIG. 6 shows heat seal curves for heat sealable flexible film structures in accordance with embodiments of the present disclosure.

FIG. 6 shows heat seal curves for heat seals produced according to Condition 2. Laminates F1, F2, F3, F5 and F6 are sealed at a sealing pressure of 3.0 N/mm$^2$ and sealing (dwell) time of 1.5 seconds.

Laminates F1, F2, F3, F5 and F6 exhibit cohesive failure (frangible seal) within seal layers at temperatures 80° C., 100° C. and 120° C.

Laminates F1, F2, F3, F5 and F6 exhibit hard seals at 140° C. Laminate F5 using resin 6 as sealant layer shows the lowest seal strength along the entire temperature range.

For laminates F1, F2, F3, F5 and F6, it can be concluded that, when the sealing temperature is 120° C. or greater, the dwell time is greater than or equal to 1.5 seconds, and the sealing pressure is greater than or equal to 0.275 N/mm$^2$, the films produce a hard seal.

Using a combination of (i) a sealing pressure greater than or equal to 3 N/mm$^2$, and (ii) a sealing (dwell) time greater than or equal to 1.5 seconds, it is possible to slightly increase seal strength at temperatures below 120° C., indicating that a combination of two out of three sealing conditions might create at least frangible seal with higher seal strength.

Bounded by no particular theory, it is believed that a sealing temperature of greater than or equal to 120° C. for a dwell time greater than or equal to 1.5 seconds decreases the viscosity of seal layer (A) such that application of a sealing pressure of greater than or equal to 3.0 N/mm$^2$ pushes or otherwise squeezes the seal layer (A) out of some parts of the seal area. With some, substantially all, or all, of the seal layer (A) out of the seal area, respective base layers (B) from the first film and the second film are pushed into contact with each other. The sealing conditions melt and fuse base layer (B) of the first film to the base layer (B) of the second film to form a hard seal. The ability to form frangible seals with layer (A) and hard seals with layer (B) while protecting the films from burn with outermost layer (C) during the heat sealing process is surprising and unexpected.

Figure 7:
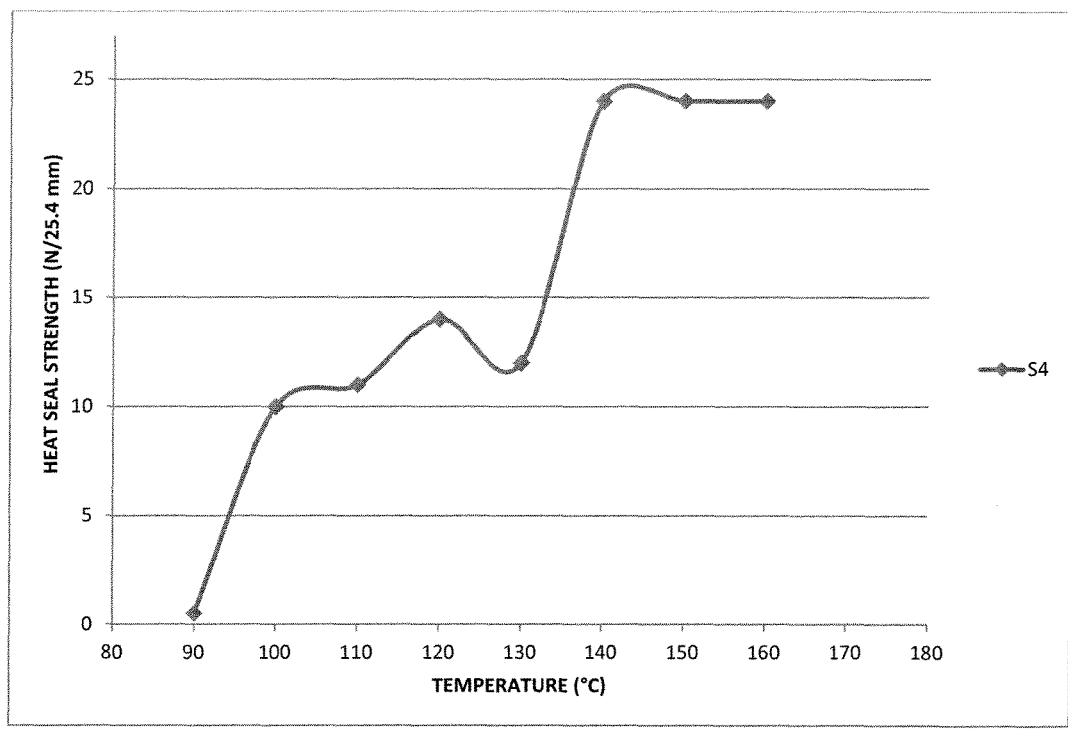
FIG. 7 shows heat seal curves for a heat sealable flexible film in accordance with embodiments of the present disclosure.

FIG. 7 shows the heat seal curve of film S4 according to conditions listed in Table 4. Film S4 shows cohesive failure (frangible seal) up to temperatures of 120° C. but exhibit hard seal at 140° C.

Table 4 provides heat seal conditions used to evaluate the Film S4.

TABLE 4

| Heat Seal Conditions | |
|---|---|
| Heat Seal Conditions | ASTM F88 |
| Equipment | J&B Hot Tack Tester |
| Sealing (dwell) time (seconds) | 0.5 |
| Sealing pressure (N/mm$^2$) | 1.0 |
| Sealing temp range (° C.) | 80-180 |

For film S4 it can be concluded that, when the sealing temperature is 120° C. or greater, the dwell time is greater than or equal to 0.5 seconds, and the sealing pressure is greater than or equal to 1.0 N/mm$^2$, the laminate produces a hard seal.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A flexible container comprising:
   a first film and a second film, each film comprising a heat sealable flexible film structure comprising:
   a seal layer (A) consisting of (i) from 35 to 80 percent by weight of the layer (A) of a propylene based plastomer or elastomer ("PBPE") and (ii) from 20 to 65 percent by weight of layer (A) of a low density polyethylene having a melt index from 0.2 g/10 min to 50 g/10 min and a density in the range of from 0.915 g/cm$^3$ to 0.935 g/cm$^3$;
   a base layer (B) comprising an ethylene-based polymer selected from the group consisting of high density polyethylene (HDPE), linear low density polyethylene, (LLDPE), low density polyethylene (LDPE) and combinations thereof; and
   an outermost layer (C) comprising a material having a melting point greater than 140° C.;
   wherein the films are arranged such that the layer (A) of each film is in contact with each other and the second film is superimposed on the first film to form a common peripheral edge; and
   a heat seal is located along at least a portion of the common peripheral edge;
   a hard seal wherein opposing layers (B) are in contact with each other; and
   a frangible seal wherein opposing layers (A) are in contact with each other.

2. The flexible container of claim 1 wherein the seal layer (A) has a thickness less than 30 microns.

3. The flexible container of claim 1 wherein the seal layer (A) comprises from 50 wt % to 80 wt % propylene/ethylene copolymer and from 50 wt % to 20 wt % low density polyethylene.

4. The flexible container of claim 1 wherein the base layer (B) comprises a high density polyethylene having a density from 0.940 g/cc to 0.965 g/cc and a melt index less than 5.0 g/10 min.

5. The flexible container of claim 1 wherein the outermost layer (C) is a material selected from the group consisting of poly(ethylene terephthalate) (PET), polyamide, propylene homopolymer, and combinations thereof.

6. The flexible container of claim 1 further comprising an inner layer (D) disposed between layer (B) and the outermost layer (C).

7. The flexible container of claim 6 wherein the inner layer (D) comprises a polymer selected from the group consisting of a high density polyethylene, a linear low density polyethylene, a low density polyethylene, ethylene vinyl alcohol copolymer, maleic anhydride-modified polyethylene, polyamide, cyclic olefin copolymer, ethylene vinyl acetate, propylene homopolymer, vinylidene chloride polymer, and combinations thereof.

8. The flexible container of claim 6 wherein the inner layer (D) comprises a high density polyethylene having a density from 0.940 g/cc to 0.965 g/cc and a melt index less than 5.0 g/10 min.

9. The flexible container of claim 1 wherein the film structure is processed via a cast extrusion process or a blown film extrusion process.

10. The flexible container of claim 1 wherein one or more of the layers is foamed.

11. The flexible container of claim 1 wherein the hard seal is located along at least one peripheral edge and wherein the frangible seal is located in an area other than the peripheral edge.

12. The flexible container of claim 1 wherein the first film and the second film are components of a single flexible sheet, the single flexible sheet folded to superimpose the second film on the first film.

13. The flexible container of claim 1 wherein the peripheral heat seal defines a container interior, the frangible seal traverses the container interior and defining two compartments.

14. The flexible container of claim 1 wherein the base layer (B) of the first film is melted and fused to base layer (B) of the second film to form the hard seal.

15. The flexible container of claim 1 wherein the flexible container is a member selected from the group consisting of a pouch, a sachet, and a stand-up pouch.

16. The flexible container of claim 15 wherein the heat seal along at least a portion of the common peripheral edge is a combination of a hard seal and a frangible seal.

17. The flexible container of claim 1 wherein the PBPE is a propylene/ethylene copolymer having greater than 0.85 substantially isotactic sequences and a crystallinity from 1% to 30%.

18. The flexible container of claim 17 wherein the layer (A) consists of a blend of 75 wt % PBPE and 25 wt % low density polyethylene, based on total weight of layer (A); and the blend has a density from 0.89 g/cc to 0.90 g/cc, and a melt index from 3.0 g/10 min to 4.0 g/10.

19. The flexible container of claim 17 wherein the layer (A) consists of a blend of 50 wt % PBPE and 50 wt % low density polyethylene, based on total weight of layer (A); and the blend has a density from 0.90 g/cc to 0.91 g/cc, and a melt index from 1.0 g/10 min to 2.0 g/10 min.

* * * * *